US012571523B2

(12) United States Patent
Yao

(10) Patent No.: US 12,571,523 B2
(45) Date of Patent: Mar. 10, 2026

(54) LAMPSHADE STRUCTURE

(71) Applicant: Chao Chin Yao, Taichung City (TW)

(72) Inventor: Chao Chin Yao, Taichung City (TW)

( * ) Notice: Subject to any disclaimer, the term of this patent is extended or adjusted under 35 U.S.C. 154(b) by 0 days.

(21) Appl. No.: 19/081,207

(22) Filed: Mar. 17, 2025

(65) Prior Publication Data

US 2026/0022822 A1 Jan. 22, 2026

Related U.S. Application Data

(63) Continuation-in-part of application No. 18/779,256, filed on Jul. 22, 2024, now abandoned.

(51) Int. Cl.

| | |
|---|---|
| ***F21V 19/00*** | (2006.01) |
| ***F21V 17/00*** | (2006.01) |
| ***F21V 17/16*** | (2006.01) |
| ***F21V 23/06*** | (2006.01) |

(52) U.S. Cl.

CPC ........ *F21V 19/0035* (2013.01); *F21V 17/005* (2013.01); *F21V 17/16* (2013.01); *F21V 23/06* (2013.01)

(58) Field of Classification Search

CPC .... F21V 19/0035; F21V 17/005; F21V 17/16; F21V 23/06

See application file for complete search history.

(56) References Cited

U.S. PATENT DOCUMENTS

| | | | | |
|---|---|---|---|---|
| 7,631,994 B2 * | 12/2009 | Halliwell | F21V 17/14 | 362/147 |
| 2006/0108137 A1 * | 5/2006 | Smith | H01R 33/46 | 174/50 |
| 2014/0160772 A1 * | 6/2014 | Wu | F21V 17/002 | 362/373 |
| 2015/0167903 A1 * | 6/2015 | Yao | F21V 19/0045 | 362/382 |
| 2018/0206305 A1 * | 7/2018 | Van Winkle | F21S 8/026 | |
| 2018/0320875 A1 * | 11/2018 | Cho | F21V 29/767 | |
| 2021/0048159 A1 * | 2/2021 | Yao | F21V 23/005 | |
| 2021/0215325 A1 * | 7/2021 | Luo | H01R 13/73 | |

* cited by examiner

*Primary Examiner* — Tsion Tumebo

(74) *Attorney, Agent, or Firm* — MUNCY, GEISSLER, OLDS & LOWE, P.C.

(57) ABSTRACT

A lampshade structure includes a lampshade housing and a base. A circuit board is accommodated in an accommodation room of the lampshade housing. The circuit board is connected to two contact electrodes. The base has a lamp holder and a lamp disk. The lamp holder has two arc-shaped grooves for insertion of the contact electrodes. The arc-shaped grooves each have a large-diameter end and a small-diameter end. An electrically-conductive element connected to an external power source is embedded in the small-diameter end. During installation, a guide post in the accommodation cavity room is moved along a guide groove on the outer peripheral wall of the lamp disk, and each contact electrode is energized by contacting the corresponding electrically-conductive element after sliding the guide post into place, so as to achieve quick installation and disassembly.

7 Claims, 6 Drawing Sheets

LAMPSHADE STRUCTURE

CROSS REFERENCE TO RELATED APPLICATION

This application is a Continuation-in-Part of co-pending application Ser. No. 18/779,256 filed on Jul. 22, 2024, the entire contents of which are hereby incorporated by reference.

FIELD OF THE INVENTION

The present invention relates to a lampshade structure, and more particularly, to a lampshade structure that can be quickly disassembled and installed.

BACKGROUND OF THE INVENTION

Ceiling fans are widely used in homes, restaurants and factories because they can create a cooling effect and increase heat exchange via convection. In order to improve the practicality of ceiling fans, ceiling fans with lights are developed on the market, such that ceiling fans have both air convection and lighting functions. In general, a lampshade is mounted under the ceiling fan. The light-emitting element in the lampshade is connected to the power wire of the ceiling fan through an electrode wire. However, when the lampshade is to be replaced, the electrode wire of the original lampshade is first separated from the power wire before connecting the electrode wire of a new lampshade to the power wire of the ceiling fan. The operation is cumbersome and difficult for non-professionals to replace the lampshade, making it quite inconvenient.

Accordingly, the inventor of the present invention has devoted himself based on his many years of practical experiences to solve these problems.

SUMMARY OF THE INVENTION

The primary object of the present invention is to provide a lampshade structure, the entire structure is simple and easier to disassemble and install.

In order to achieve the foregoing object, the lampshade structure provided by the present invention comprises a lampshade housing and a base. Two contact electrodes are provided on a circuit board inside the lampshade housing. A lamp holder of the base is formed with two arc-shaped grooves for the insertion of the contact electrodes. The arc-shaped grooves each have a large-diameter end and a small-diameter end. An electrically-conductive element connected to an external power source is embedded in the small-diameter end. A plurality of elastic contact members are elastically located at the bottom of the lamp holder. Guide grooves are disposed along the peripheral wall of the lamp disk corresponding the guide posts inside the lampshade housing. As the lampshade housing is rotated, the guide posts are moved along the guide grooves and the elastic contact members are elastically pushed to exert a downward pressure applied on the top of the insulating plate for position the lampshade housing. The two contact electrodes are simultaneously moved along the corresponding arc-shaped grooves to contact the electrically-conductive elements, thereby supplying power to the circuit board.

DETAILED DESCRIPTION OF THE PREFERRED EMBODIMENTS

Figure 1:
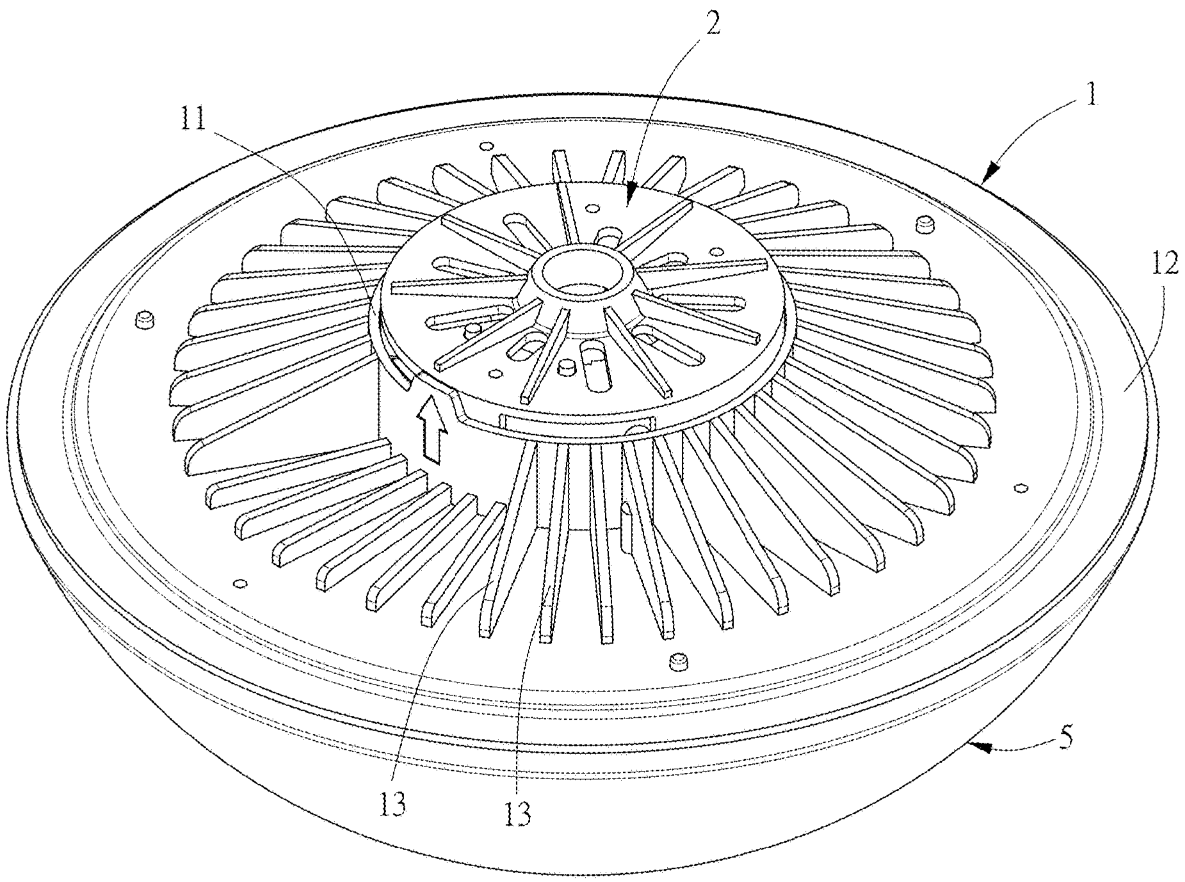
FIG. 1 is a perspective view of the present invention.
Figure 5:
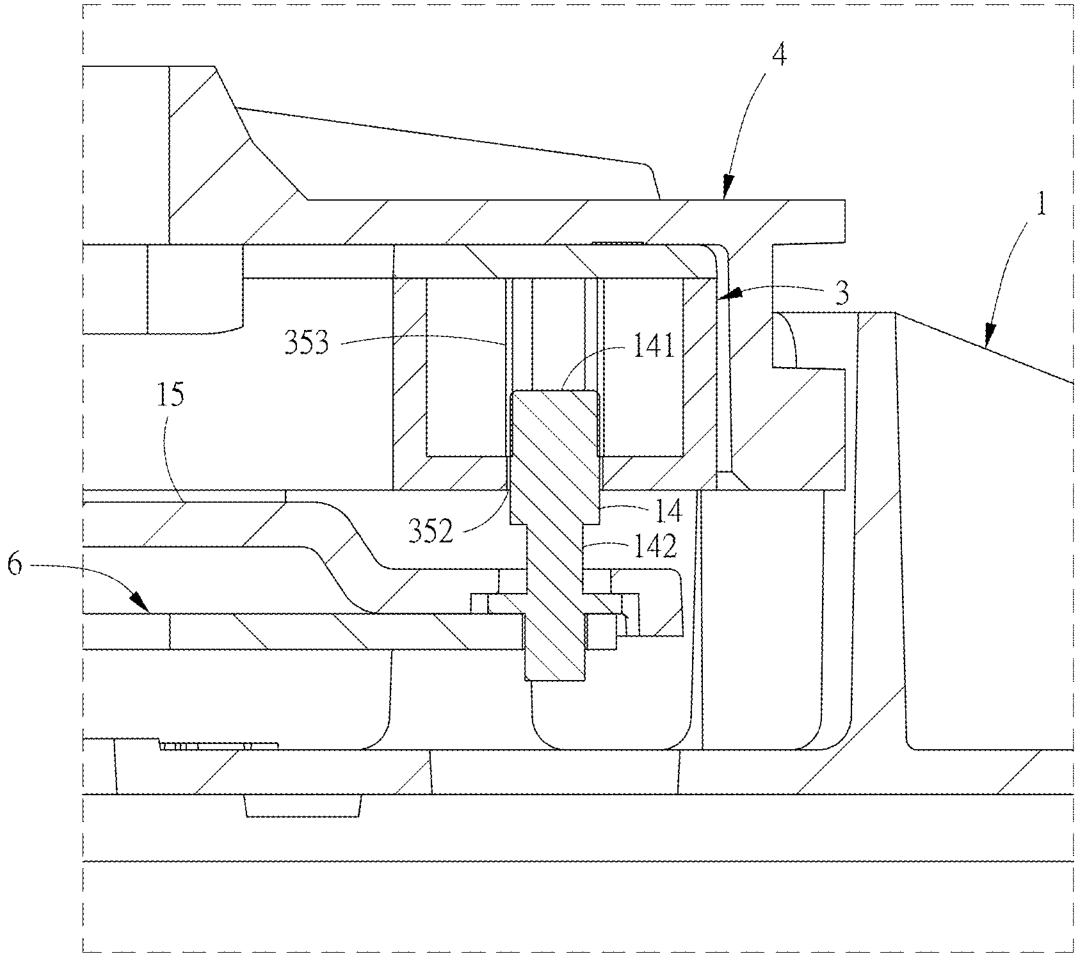
FIG. 5 is a partial section view of the present invention, wherein the contact electrode is located in the small-diameter end of the arc-shaped groove and is in contact with the electrically-conductive element.

As shown in FIG. 1 and FIG. 5, the present invention discloses a lampshade structure, comprising a lampshade housing 1 and a base 2. The lampshade housing 1 has an accommodation room 11 for accommodating a circuit board 6. The bottom edge of the accommodation room 11 extends outwardly to form a mounting plate 12. A lamp panel (not shown in the figure) is provided on the underside of the mounting plate 12 and is electrically connected to the circuit board 6. A cover 5 is mounted to the underside of the mounting plate 12 for covering the lamp panel (not shown in the figure). A plurality of spaced heat dissipation ribs 13 connected to the outer periphery of the accommodation room 11 are disposed on the top of the mounting plate 12 for dissipating the heat generated by the lamp panel. The base 2 includes a lamp holder 3 and a lamp disk 4. The lamp holder 3 is mounted in the lamp disk 4. The outer peripheral wall of the lamp disk 4 is locked to the inner wall of the accommodation room 11.

The circuit board 6 is locked in the accommodation room 11 and has two symmetrical contact electrodes 14 extending upwardly. In this embodiment, the circuit board is a printed circuit board (PCB), and the two contact electrodes 14 are copper posts. Particularly, the two contact electrodes have a head 141 and an axis 142, the outer diameter of the head 141 is larger than the outer diameter of the axis 142. The two contact electrodes 14 are symmetrically welded to the PCB by the axis 142. An insulating plate 15 is disposed on top of the circuit board 6 for protecting the circuit board 6.

The lamp holder 3 has a body 31 and a top plate 32. The top plate 32 has at least one clastic buckle 33 extending downwardly from the inner periphery of the top plate 32. In this embodiment, the top plate 32 has two elastic buckles 33. The inner peripheral wall of the body 31 is formed with a buckle groove 34 corresponding to the elastic buckle 33. The clastic buckle 33 is engaged with the buckle groove 34 so that the top plate 32 is secured to and closes the body 31. The bottom of the body 31 has two arc-shaped grooves 35 for insertion of the contact electrodes 14. Each arc-shaped groove 35 has a large-diameter end 351 and a small-diameter end 352. An electrically-conductive element 353 is embedded in the small-diameter end 352 and located in the body 31. The electrically-conductive element 353 is connected to an external power source. The electrically-conductive element 353 has a contact hole 355 at one end and an enlarged opening 354 at the other end, the contact hole 355 is communicated with the enlarged opening 354 via a narrow channel. For installation, as shown FIG. 3, the head 141 of each contact electrode 14 is inserted from the corresponding large-diameter end 351 and moved along the corresponding arc-shaped groove 35 to the opening 354 of the electrically-conductive element 353 by the axis 142. After that, as shown in FIG. 4, each contact electrode 14 is moved into the small-diameter end 352. At this time, the head 141 of the contact electrode 14 is in contact with the contact hole 355, thereby forming a power supply circuit for supplying power to the circuit board 6.

Figure 3:
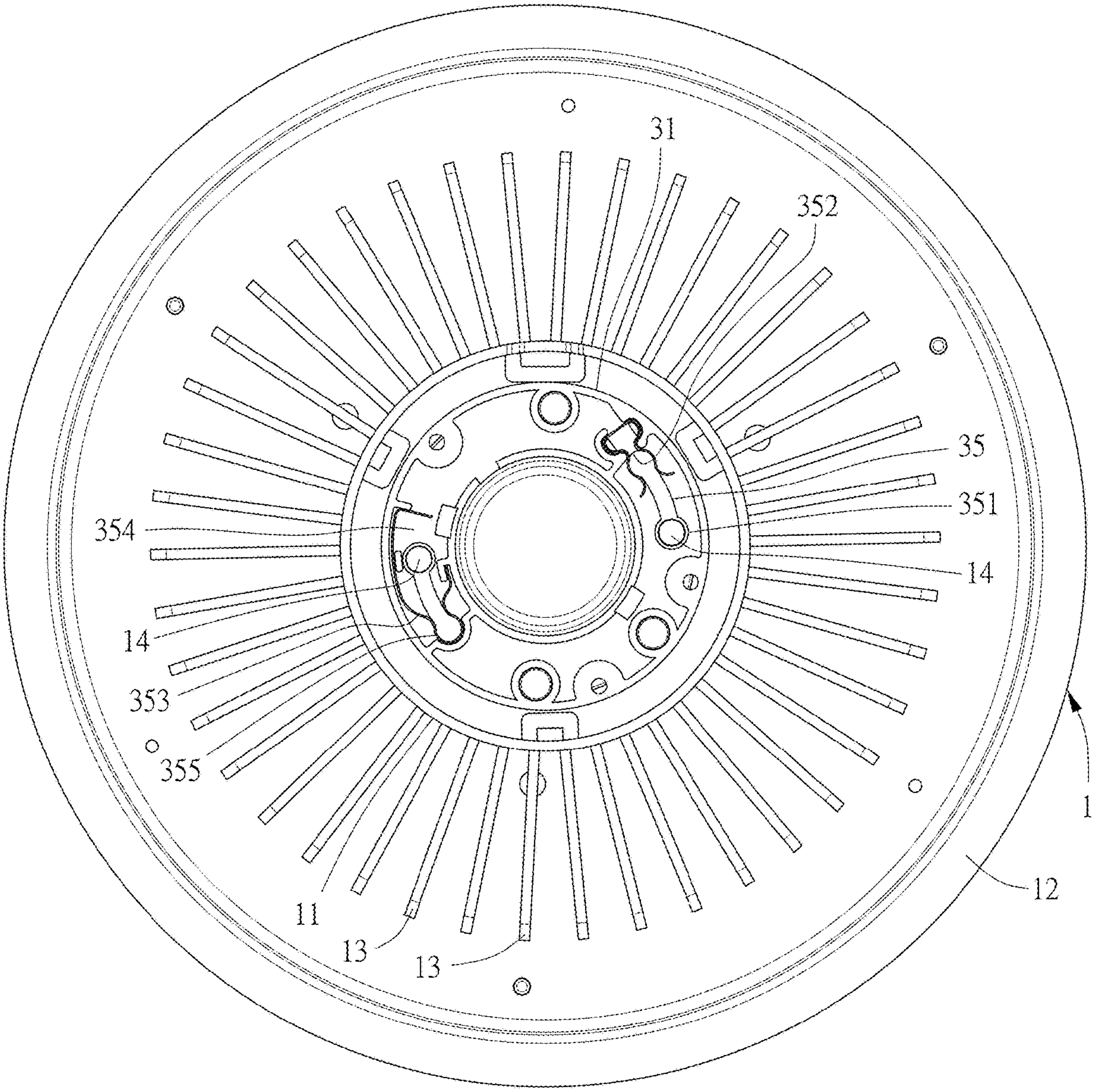
FIG. 3 is a schematic view of the present invention, wherein the contact electrode is located in the large-diameter end of the arc-shaped groove.
Figure 4:
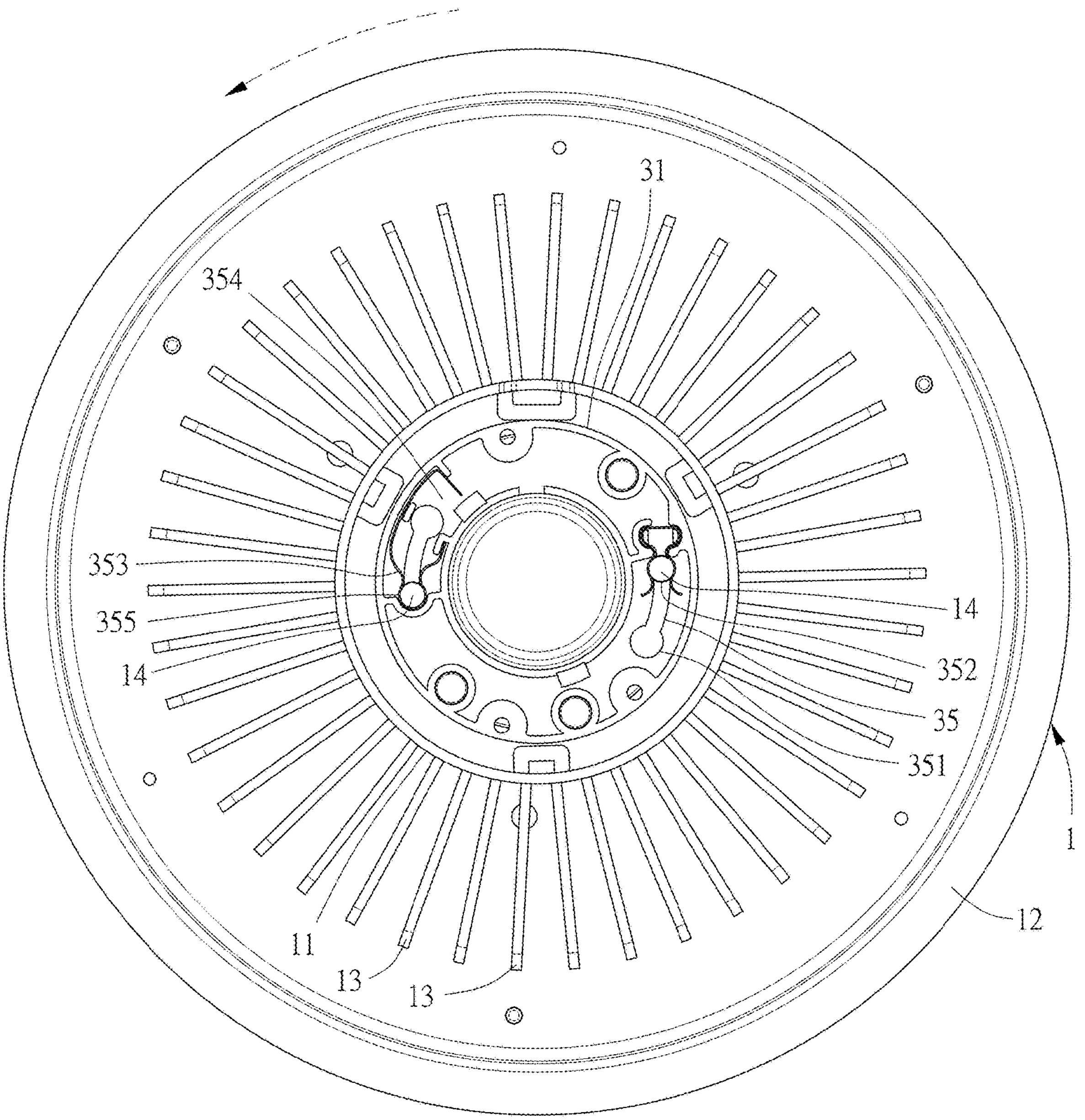
FIG. 4 is a schematic view of the present invention, wherein the contact electrode is located in the small-diameter end of the arc-shaped groove and is in contact with the electrically-conductive element.
Figure 6:
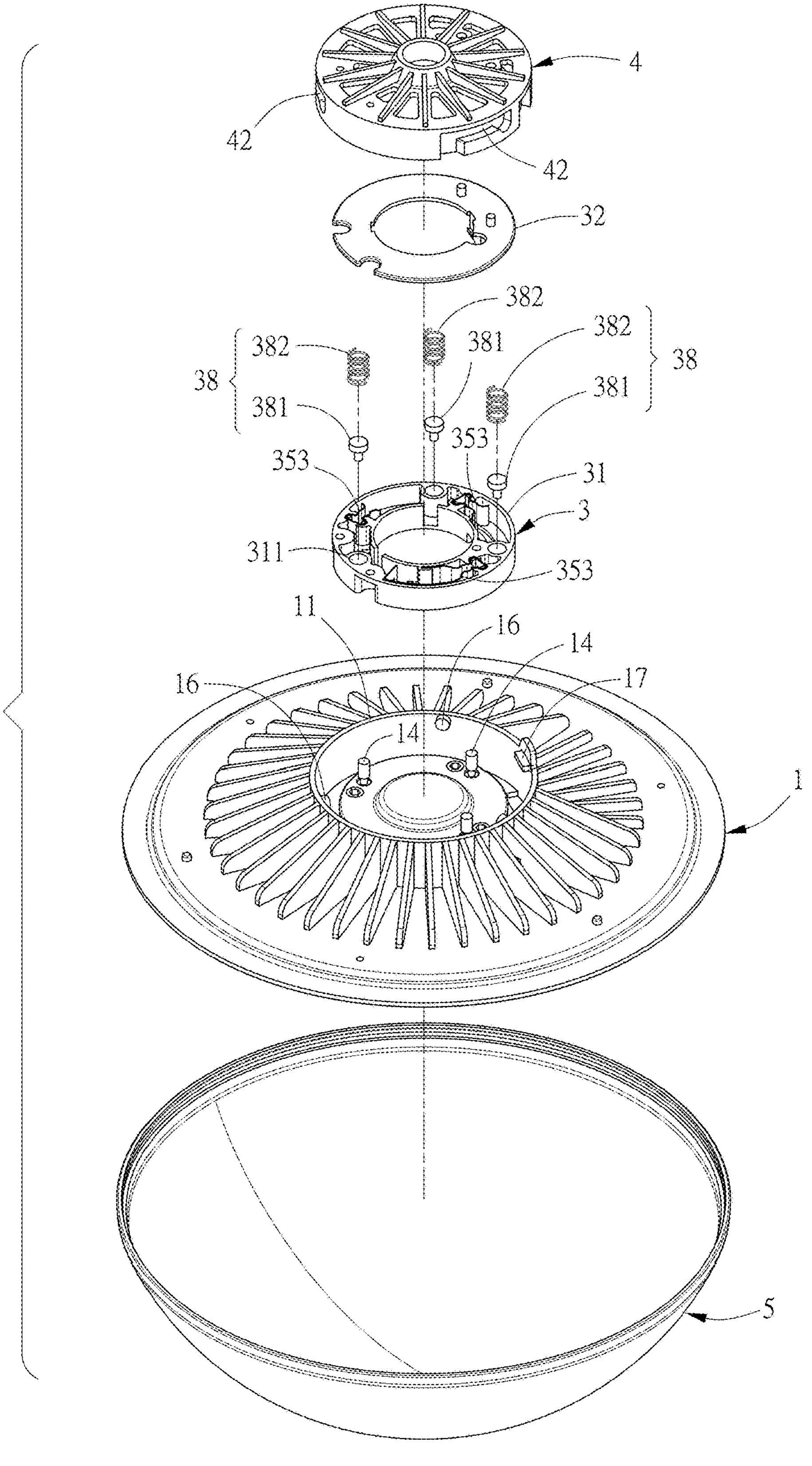
FIG. 6 is an exploded view of another implementation of the present invention.

In other possible implementations, as shown in FIG. 6 in conjunction with FIG. 3 to FIG. 5, the circuit board 6 has three contact electrodes 14 extending upwardly. The bottom of the body 31 has three arc-shaped grooves 35 for insertion of the contact electrodes 14. The head 141 of the contact electrode 14 is inserted from the corresponding large-diameter end 351 and the axis 142 of the contact electrode 14 moved along the arc-shaped groove 35 to enter the small-diameter end 352 and the head 141 is in contact with the electrically-conductive element 353, thereby forming an electrically-conductive loop.

Figure 2:
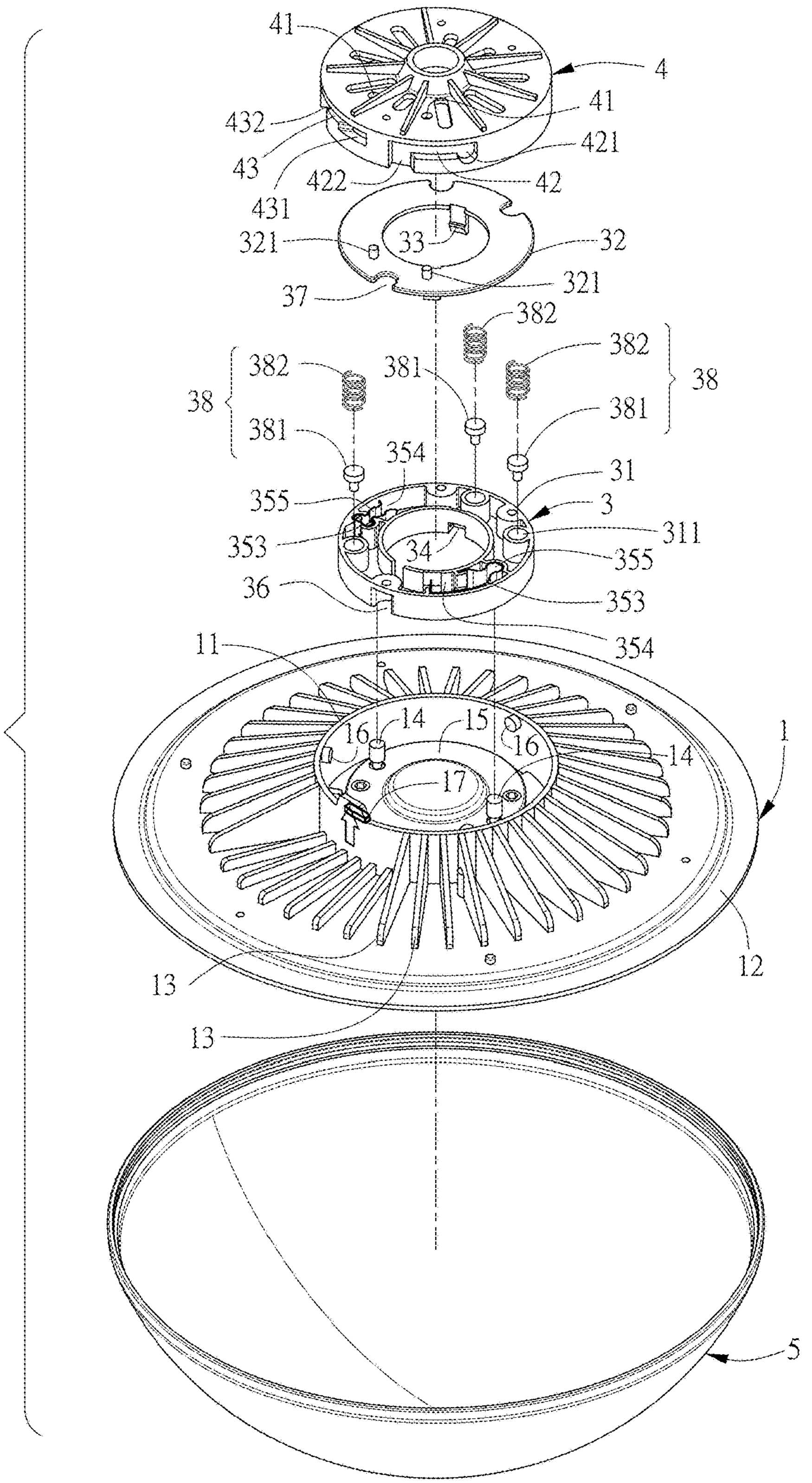
FIG. 2 is an exploded view of the present invention.

Referring to FIG. 2, at least one first mounting hole 36 recessed inwardly is formed in the outer peripheral wall of the body 31 for insertion of a locking element. This embodiment has three first mounting holes 3. The top plate 32 has three second mounting holes 37 correspondingly. The locking elements are inserted through the first mounting holes 36 and the second mounting holes 37 and locked to the lamp disk 4, respectively, so that the lamp holder 3 is assembled in the lamp disk 4 to form a one-piece structure, which is convenient for connecting the lampshade housing 1. The top plate 32 further has at least one positioning post 321. The lamp disk 4 has at least one positioning hole 41 corresponding to the positioning post 321. The positioning post 321 is inserted through the positioning hole 41 to locate the installation position of the lamp holder 3 relative to the lamp disk 4, such that the lamp holder 3 is locked in the lamp disk 4 through the locking elements such as hexagonal screws, countersunk head screws, etc.

At least two guide grooves 42 are disposed along the peripheral wall of the lamp disk 4. In this embodiment, the outer peripheral wall of the lamp disk 4 has three guide grooves 42 that are arranged at equal intervals. The inner wall of the accommodation room 11 has guide posts 16 corresponding to the respective guide grooves 42. The guide posts 16 are slidable along the guide grooves 42, respectively. As the lamp disk 4 is assembled under a ceiling fan, the vibration generated by the rotation of the motor of the ceiling fan may cause the connection of the lampshade housing 1 and the lamp disk 4 to loosen as a result of the relative rotation, and there is a risk of falling off. In order to solve this problem, each guide groove 42 of the present invention has one end formed with a closed arc-shaped recess 421 and another end extending to and communicating with the bottom edge of the lamp disk 4 to form a guide inlet 422. The guide post 16 on the inner wall of the accommodation room 11 is moved to slide along the corresponding guide groove 42 from the corresponding guide inlet 422 to be positioned in the arc-shaped recess 421 along with rotation of the lampshade housing 1. The arc-shaped recess 421 confines the offset travel of the guide post 16 to position the lampshade housing 1, solving the problem of looseness of the lampshade housing 1 due to inertial centrifugal force.

In order to ensure accurate alignment for installation, the outer peripheral wall of the lamp disk 4 of the present invention further has an installation indication groove 43. The installation indication groove 43 is disposed between the two guide grooves 42. The installation indication groove 43 has one end formed with a closed rectangular recess 431 and another end extending to and communicating with the bottom edge of the lamp disk 4 to form an entrance 432. A rectangular mounting block 17 is provided on the inner wall of the accommodation room 11. For installation, the mounting block 17 is moved upward from the entrance 432. At this time, each guide post 16 is moved into the corresponding guide groove 42 from the guide inlet 422. After that, the lampshade housing 1 is rotated so that the mounting block 17 is moved along the installation indication groove 43 to be engaged in the rectangular recess 431, and each guide post 16 is simultaneously moved along the corresponding guide groove 42 to be engaged in the arc-shaped recess 421. The installation indication groove 43 cooperates with the mounting block 17 to assist in the combination of the lampshade housing 1 and the lamp disk 4.

The present invention further comprises a plurality of elastic contact members 38 at the bottom of the body 31. Each elastic contact member 38 is mounted in a corresponding compartment 311 in the body 31, each elastic contact member 38 has a contact cylinder 381 and a spring 382, the contact cylinder 381 has one end extending out of the compartment 311, and another end resting against the spring 382 for being elastically located at the bottom of the body 31.

When the lampshade housing 1 is installed, the contact cylinders 381 are in contact with the top of the insulating plate 15 and pushed on the springs 382. Due to the return force of the spring 382, a certain amount of resistance is generated, which in turn corrects a relative position of the insulating plate 15 and the lamp holder 3 and ensures that the guide posts 16 are moved into the corresponding guide grooves 42 synchronously in the mounting process. When the lampshade housing 1 rotates until the guide posts 16 are fallen into the respective arc-shaped recess 421, each contact cylinder 381 is elastically pushed via the spring 382 to exert a downward pressure applied on the top of the insulating plate 15 for the guide posts 16 engaged in the corresponding arc-shaped recess 421 to position the lampshade housing 1 so that it will not be easily loosened.

When this embodiment is actually used, the mounting block 17 of the lampshade housing 1 is aligned with the entrance 432 of the installation indication groove 43 and moved upwardly until each contact cylinder 381 is against the insulating plate 15 inside the lampshade housing 1 to correct the installation plane on a horizontal plane. At this time, the mounting block 17 and each guide post 16 are moved into the entrance 432 and the guide inlet 422 simultaneously. As shown in FIG. 3, the head 141 of each contact electrode 14 is moved in the large-diameter end 351 of the corresponding arc-shaped groove 35. The lampshade housing 1 is pushed upward by applying a further force and the axis 142 of the contact electrodes 14 are moved to slide along the respective arc-shaped grooves 35 with the rotation of the lampshade housing. The lampshade housing 1 is rotated until the lampshade housing 1 can no longer be rotated, so that the mounting block 17 and each guide post 16 are positioned in the rectangular recess 431 and the arc-shaped recess 421, at the same time the contact cylinders 381 are pushed via the insulating plate 15 to compress the springs 382. When the force is released, the mounting block 17 and each guide post 16 are engaged in the rectangular recess 431 and the arc-shaped recess 421 respectively under the self-weight of the lampshade housing 1 and the downward pressure exerted through the contact cylinders 381 which are pushed via the spring 382, so as to position the lampshade housing 1. Then, the lampshade housing 1 is locked to the base 2. As shown in FIG. 4 and FIG. 5, the head 141 of the contact electrode 14 is embedded in the small-diameter end 352 for being stabilized in the small-diameter end 352 without shifting the position. The head 141 of the contact electrode 14 is in contact with the electrically-conductive element 353 to form a power supply circuit, which can supply power to the circuit board to energize the lamp panel that is electrically connected to the circuit board for illumination.

When the lampshade housing 1 is to be replaced, the lampshade housing 1 is pushed upwardly by applying a force to push the contact cylinder 381 via the insulating plate 15 to retract into the body 31 and compress the spring 382 until it cannot be pushed anymore. At this time, each guide post 16 is moved upwardly from the corresponding arc-shaped recess 421 to release the restriction on the guide post 16 and the head 141 of contact electrode 14 is also released from the small-diameter end 352. Then, the lampshade housing 1 is rotated in a direction opposite to the installation direction, and each guide post 16 is moved along the corresponding guide groove 42 to the guide inlet 422, and the mounting block 17 is moved along the installation indication groove 43 to the entrance 432 simultaneously, at the same time the axis 142 of the contact electrode 14 is moved along the arc-shaped groove 35 to the large-diameter end 351. After the force is released, the lampshade housing 1 will fall off under its own weight, and the disassembly of the lampshade housing 1 is completed.

The lampshade structure provided by the present invention has the following technical advances and advantages:

1. Simple operation, easy to assemble and disassemble. In the present invention, the contact electrodes of the circuit board are insertedly connected to the electrically-conductive elements of the lamp holder to form a power supply circuit. There is no need to separate the electrode wire from the power wire during replacement. The lampshade housing and the lamp disk of the base are rotatably locked, which can be quickly disassembled and installed. The operation is simple and easy to get started.

2. Precise alignment to ensure accurate installation. In the present invention, the outer peripheral wall of the lamp disk has the installation indication groove, and the accommodation room has the corresponding mounting block. The connection position of the guide groove and the guide post is located through the assembly position of the mounting block and the installation indicating groove. The bottom of the lamp holder has the plurality of elastic contact members. The contact members are against the top of the insulating plate in an elastic manner, such that the lampshade housing is corrected to be on a horizontal plane, and the installation position is accurately located to ensure that the contact electrodes are accurately inserted into the arc-shaped grooves and connected to the electrically-conductive elements.

Although particular embodiments of the present invention have been described in detail for purposes of illustration, various modifications and enhancements may be made without departing from the spirit and scope of the present invention. Accordingly, the present invention is not to be limited except as by the appended claims.

What is claimed is:

1. A lampshade structure, comprising:

a lampshade housing, having an accommodation room for accommodating a circuit board, the circuit board being connected to two contact electrodes extending upwardly, an insulating plate being disposed on top of the circuit board;

a base, including a lamp holder and a lamp disk, the lamp holder being mounted in the lamp disk, an outer peripheral wall of the lamp disk being locked to an inner wall of the accommodation room, the lamp holder having two arc-shaped grooves for insertion of the contact electrodes, the arc-shaped grooves each having a large-diameter end and a small-diameter end, an electrically-conductive element connected to an external power source being embedded in the small-diameter end, the electrically-conductive element has a contact hole at one end and an enlarged opening at the other end, the contact hole is communicated with the enlarged opening via a narrow channel, for electrical connection with a corresponding one of the contact electrodes to supply power to the circuit board;

a plurality of clastic contact members, being mounted in a corresponding one of the compartments in the lamp holder, each elastic contact member has a contact cylinder and a spring, the contact cylinder has one end extending out of the compartment, and another end resting against the spring for being elastically located at the bottom of the lamp holder;

wherein at least two guide grooves are disposed along the peripheral wall of the lamp disk, and the guide grooves each have one end formed with a closed arc-shaped recess and another end extending to and communicating with a bottom edge of the lamp disk to form a guide inlet, the inner wall of the accommodation room has at least two guide posts slidable from the guide inlets of the respective guide grooves into the respective guide grooves, the guide posts are moved to slide along the respective guide grooves and the contact electrodes are also moved to slide along the respective arc-shaped grooves along with rotation of the lampshade housing; so that the contact cylinders contact a top of the insulating plate and are rested against the springs for correcting a relative position of the insulating plate and the lamp holder, the lampshade housing is rotated until the guide posts are fallen into the respective arc-shaped recess, the contact cylinders are elastically pushed via the spring to exert a downward pressure applied on the top of the insulating plate for the guide posts engaged in the corresponding arc-shaped recess to position the lampshade housing, the contact electrodes are moved simultaneously to pass through the openings of the electrically-conductive elements to the contact holes so that the contact electrodes are in contact with the electrically-conductive elements respectively to supply power to the circuit board.

2. The lampshade structure as claimed in claim 1, wherein each contact electrodes has a head and an axis, the outer diameter of the head is larger than the outer diameter of the axis.

3. The lampshade structure as claimed in claim 1, wherein the outer peripheral wall of the lamp disk further has an installation indication groove, the installation indication groove has one end formed with a closed rectangular recess and another end extending to and communicating with a bottom edge of the lamp disk to form an entrance, a rectangular mounting block is provided on the inner wall of the accommodation room, and the mounting block is moved along the installation indication groove to be engaged in the rectangular recess along with rotation of the lampshade housing, so as to assist in locating an installation direction of the lampshade housing.

4. The lampshade structure as claimed in claim 1, wherein the lamp holder includes a body and a top plate, the top plate has at least one elastic buckle extending downwardly from an inner periphery of the top plate, an inner peripheral wall of the body is formed with a buckle groove corresponding to the elastic buckle, and the elastic buckle is engaged with the buckle groove so that the top plate is secured to and closes the body.

5. The lampshade structure as claimed in claim 4, wherein at least one first mounting hole recessed inwardly is formed in the outer peripheral wall of the body for insertion of a locking element, the top plate has at least one second mounting hole corresponding to the first mounting hole, and the locking element is inserted through the first mounting hole and the second mounting hole and locked to the lamp disk.

6. The lampshade structure as claimed in claim 1, wherein at least one positioning post is provided on a top of the lamp holder, the lamp disk has at least one positioning hole corresponding to the positioning post, and the positioning post is inserted through the positioning hole to locate an installation position of the lamp holder relative to the lamp disk.

7. The lampshade structure as claimed in claim 1, wherein a bottom edge of the accommodation room extends outwardly to form a mounting plate, a lamp panel is provided on an underside of the mounting plate and is electrically connected to the circuit board, a cover is mounted to the underside of the mounting plate for covering the lamp panel, and a plurality of spaced heat dissipation ribs connected to an outer periphery of the accommodation room are disposed on a top of the mounting plate for dissipating heat generated by the lamp panel.

* * * * *